US011103851B2

(12) United States Patent
Brinkman et al.

(10) Patent No.: US 11,103,851 B2
(45) Date of Patent: Aug. 31, 2021

(54) METHODS WITH A CONSTRUCTION THAT ABSORBS AN ORGANIC CHEMICAL

(71) Applicants: John S. Brinkman, Welland (CA); Steven Floyd Nielsen, Charlotte, NC (US)

(72) Inventors: John S. Brinkman, Welland (CA); Steven Floyd Nielsen, Charlotte, NC (US)

(73) Assignee: Imbibitive Technologies Corporation, Niagara Falls, NY (US)

( * ) Notice: Subject to any disclaimer, the term of this patent is extended or adjusted under 35 U.S.C. 154(b) by 0 days.

(21) Appl. No.: 16/974,138

(22) Filed: Oct. 16, 2020

(65) Prior Publication Data
US 2021/0039069 A1    Feb. 11, 2021

Related U.S. Application Data

(62) Division of application No. 15/732,172, filed as application No. PCT/US2016/000028 on Mar. 30, 2016.
(Continued)

(51) Int. Cl.
B01J 20/26          (2006.01)
B01J 20/28          (2006.01)
(Continued)

(52) U.S. Cl.
CPC ........ *B01J 20/267* (2013.01); *B01D 17/0202* (2013.01); *B01D 53/02* (2013.01); *B01J 20/24* (2013.01); *B01J 20/261* (2013.01); *B01J 20/2803* (2013.01); *B01J 20/2804* (2013.01); *B01J 20/28004* (2013.01); *B01J 20/28026* (2013.01); *B01J 20/28028* (2013.01);
(Continued)

(58) Field of Classification Search
None
See application file for complete search history.

(56) References Cited

U.S. PATENT DOCUMENTS 4,302,337 A * 11/1981 Larson ............... B01D 17/0202
                                                    210/287
5,374,600 A * 12/1994 Hozumi ............... A01K 97/045
                                                    502/402
(Continued)

OTHER PUBLICATIONS

USPTO, Public Patent Application Information Retrievals of Application Data, Continuity Data, and Transaction History, U.S. Appl. No. 07/647,064, obtained on May 19, 2021.
(Continued)

Primary Examiner — Clare M Perrin
(74) Attorney, Agent, or Firm — Christopher John Rudy

(57) ABSTRACT

Construction for absorbing a fluid, for example, a liquid or gaseous, organic chemical, has an extended web, fabric, yarn or foam member and associated with the extended web, fabric, yarn or foam member is a water-insoluble polymer. The water-insoluble polymer can absorb the fluid organic chemical, and the construction provides for contact of the water-insoluble polymer with the fluid organic chemical when deployed in an environment where the fluid organic chemical may be present for absorption. The construction may be employed in aquatic, aqueous, or dry environments, as a blotter, a wipe or sponge, a filter, in a cartridge, and so forth.

20 Claims, 5 Drawing Sheets

Related U.S. Application Data

(60) Provisional application No. 62/178,122, filed on Mar. 31, 2015.

(51) Int. Cl.

| | |
|---|---|
| *B01J 20/32* | (2006.01) |
| *B01J 20/24* | (2006.01) |
| *B01J 20/30* | (2006.01) |
| *B01D 53/02* | (2006.01) |
| *C09K 3/32* | (2006.01) |
| *B01D 17/02* | (2006.01) |

(52) U.S. Cl.
 CPC ..... *B01J 20/28033* (2013.01); *B01J 20/3042* (2013.01); *B01J 20/321* (2013.01); *B01J 20/3204* (2013.01); *B01J 20/3206* (2013.01); *B01J 20/3208* (2013.01); *B01J 20/3282* (2013.01); *B01J 20/3295* (2013.01); *C09K 3/32* (2013.01); *B01D 2253/202* (2013.01); *B01D 2253/25* (2013.01); *B01D 2257/702* (2013.01); *B01D 2257/7022* (2013.01); *B01D 2257/7027* (2013.01)

(56) References Cited

U.S. PATENT DOCUMENTS

| | | |
|---|---|---|
| 5,641,847 A | 6/1997 | Hozumi et al. |
| 2007/0048876 A1* | 3/2007 | Flor ..................... G01N 31/22 436/166 |
| 2007/0227977 A1* | 10/2007 | Fadhel ................... C02F 1/681 210/693 |

OTHER PUBLICATIONS

USPTO, Global Dossier for U.S. Appl. No. 08/126,731, obtained on May 19, 2021.

USPTO, Public Patent Application Information Retrieval of Transaction History for U.S. Appl. No. 08/126,731, obtained on May 19, 2021.

Bai et al., Reactive and Functional Polymers, vol. 63, pp. 43-53, Apr. 2005, Abstract only.

Wei et al., Macromolecules 2003, 36, 13, 4960-4966, Jun. 6, 2003, Abstract only.

\* cited by examiner

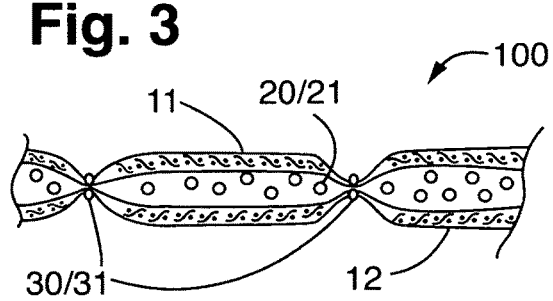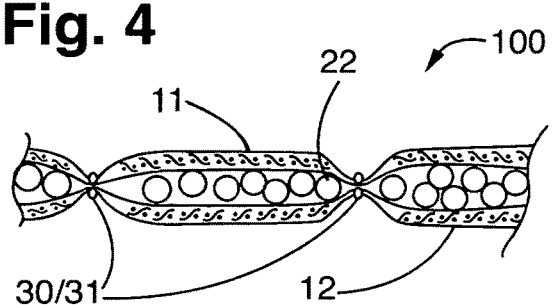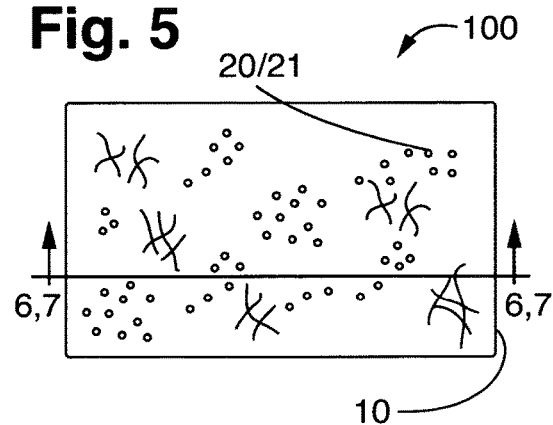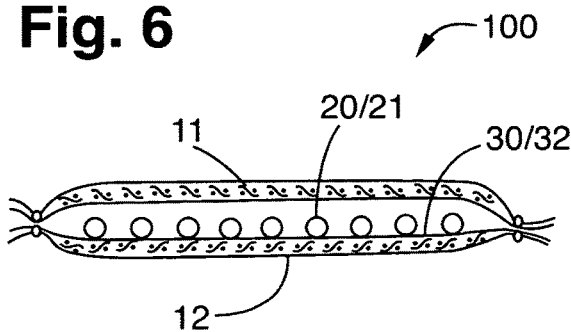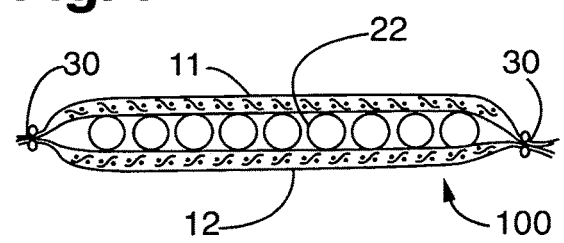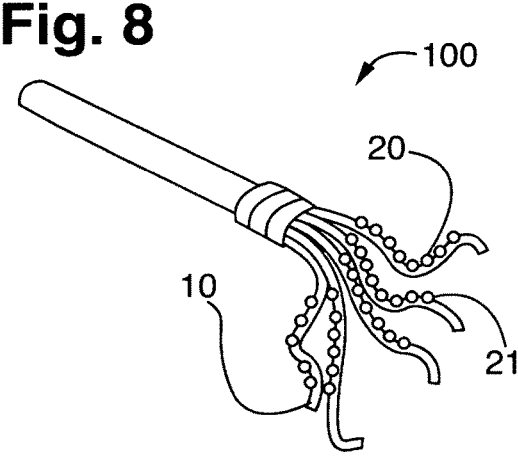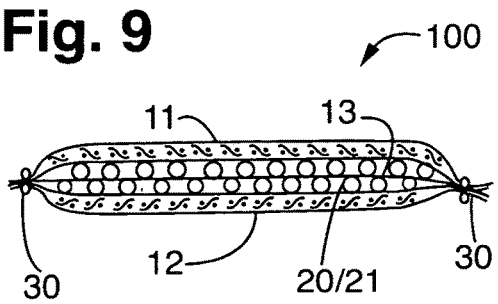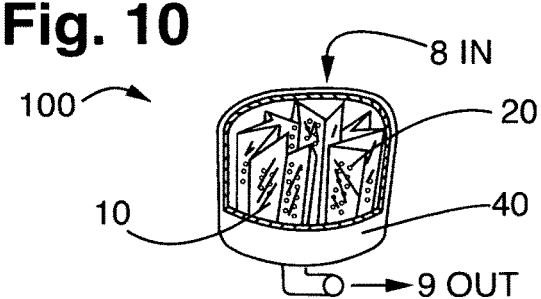

METHODS WITH A CONSTRUCTION THAT ABSORBS AN ORGANIC CHEMICAL

This is a divisional of parent patent application U.S. Ser. No. 15/732,172 filed on Sep. 27, 2017 A.D., which, as does this divisional therethrough, claims the benefits of international patent application No. PCT/US2016/000028 filed on Mar. 30, 2016 A.D., which, as does the parent and the present divisional therethrough, claims the benefits of provisional patent application No. U.S. 62/178,122 filed on Mar. 31, 2015 A. D. The specifications of those applications, to include their drawings, are incorporated herein by reference in their entireties.

U.S. Pat. Nos. 3,322,695, 3,750,688, 4,302,337 and 5,149,335 and 7,169,318 B1, 7,704,750 B2 and 7,862,779 B2 are incorporated herein by reference in their entireties. U.S. Pat. Nos. 5,167,764 and 5,167,765 are likewise incorporated herein by reference in their entireties.

FIELD AND PURVIEW OF THE INVENTION

This concerns a construction such as having a web, fabric, yarn, or open foam and so forth, which can absorb organic chemicals, making the construction, and its use. As illustrative examples, the construction may be in a form of a flexible, liquid-pervious sheet web "sandwich," with opposing sheets having between them an entrapped supply, which may be such an amount as may form a thin layer, of water-insoluble, particulate polymer particles that imbibe liquid or gaseous organic chemicals; or as additional examples, the construction may be in a form of an open woven or nonwoven web, a yarn, or a reticulate foam, having an entrapped supply of water-insoluble, particulate polymer particles that imbibe liquid or gaseous organic chemicals. The construction may be used in any suitable environment, for example, aquatic, aqueous or dry.

BACKGROUND TO THE INVENTION

Among the most useful products for absorbing organic chemicals, especially organic spills in an aquatic environment, are those from Imbibitive Technologies Corporation. These include products configured in pillows, blankets, booms, drains, and so forth, which contain the well-known Imbiber Beads® water-insoluble, particulate polymer particles, which imbibe liquid organic materials. Although highly versatile and efficient, such products are not, and are not meant to be, applicable with their customary efficiency in all situations. For example, use of such products, although highly effective, may not be warranted where a quantity of organic chemicals may be expected to be or has been spilled that is significantly less than the capacity of such products, which, commonly speaking, represents the "overkill" phenomenon, as to performance, cost, and waste of unnecessary, unused absorbent that may be disposed.

It would be desirable to address such formal shortcomings in such an outstanding product line, and provide for a product to apply more directly to such situations as mentioned above. It would be desirable to provide the art an alternative.

A FULL DISCLOSURE OF THE INVENTION

In address of the foregoing, provided hereby is a construction for absorbing a fluid, for example, a liquid or gaseous, organic chemical, which comprises an extended web, fabric, yarn or foam member having a water-insoluble polymer associated therewith, wherein the water-insoluble polymer can absorb the fluid organic chemical, and said construction provides for contact of the water-insoluble polymer with the fluid organic chemical when deployed in an environment where the fluid organic chemical may be present for absorption. The construction may be employed in aquatic, aqueous, or dry environments in which for practical purposes water is absent, as a blotter, a wipe or sponge, a filter, in a cartridge, and so forth.

The construction is useful in absorbing organic chemicals, as from spills or vapors.

Significantly, by the present construction, the art is advanced in kind, and a viable alternative is provided. It provides for a spill-control product that can be applied more directly and efficiently to such situations as mentioned above, particularly where the amount of spilled target organic chemical is smaller in amount; is easy and efficient to manufacture and most efficient to employ; can avoid the "overkill" phenomenon, has excellent versatility of itself; and adds versatility to the product line mentioned above. Air and liquid filters may be provided.

Numerous further advantages attend the present construction, its making, and use.

The drawings form part of the specification hereof. With respect to the drawings, which are not necessarily drawn to scale, the following is briefly noted:

FIG. 1 is a perspective, exploded plan view of an embodiment of a construction for absorbing a fluid organic chemical, before assembly, which comprises a first extended web member, designated a top extended web member, and a second extended web member, designated a bottom extended web member; and between the top and bottom extended web members, a sample of water-insoluble, particulate polymer particles, which imbibe liquid organic materials. Assembly, in general, would bring the top and bottom extended web members to close upon one another and entrap, entrain or envelop the particle sample.

FIG. 2 is a top view of another embodiment of a construction for absorbing a liquid organic chemical, assembled, which comprises top and bottom extended web members, for example, of melt blown polypropylene, between which is a sample of water-insoluble, particulate polymer particles, here, cross-linked polystyrene beads, which imbibe organic materials. The top and bottom extended web members are mechanically affixed, with the beads between, here, with staples, which serve to affix the extended web members plus sequester the beads in pockets or more discrete areas smaller than each web member's overall area. The construction is floating in water, which had target liquid organic substance imbibed by the beads, which released a color to indicate absorption.

FIG. 3 is a side, cross-sectional view of the construction of FIG. 2, taken along section 3,4-3,4 therein, before the absorption of the liquid organic chemical target by the beads.

FIG. 4 is a side, cross-sectional view of the construction of FIG. 2, taken along section 3,4-3,4 therein, after the absorption of the liquid organic chemical target by the beads.

FIG. 5 is a top view of an illustrative embodiment of a construction for absorbing a liquid organic chemical, which comprises an extended web member, designated a first extended web member, having water-insoluble polymer adhered thereto. More particularly, this shows a first sheet of a plastic generally through which water, water and liquid organic chemical that may be dissolved in or otherwise carried by the water, or liquid organic chemical itself can pass or traverse, to which cross-linked polystyrene beads are adhered, before absorption of liquid organic chemical by the beads.

FIG. 6 is a side, cross-sectional view of the construction of FIG. 5, taken along section 6,7-6,7 therein, which further includes a second extended web member of a plastic (top) added to cover the water-insoluble polymer adhered to the first extended web member (bottom), before absorption of liquid organic chemical by the beads.

FIG. 7 is a side, cross-sectional view of the construction as of FIG. 5, taken along section 6,7-6,7 therein, after absorption of liquid organic chemical by the beads.

FIG. 8 is a perspective view of an illustrative embodiment of a construction for absorbing a liquid organic chemical, which comprises an extended member in a form of a yarn having water-insoluble polymer adhered thereto. This may be embodied within a mop, and so forth.

FIG. 9 is a side, cross-sectional view of a construction for absorbing a fluid organic chemical, which has multiple web layers, for example, from top, middle and bottom, with water-insoluble polymer for absorbing fluid organic chemical, for example, as beads, between.

FIG. 10 is a perspective view in partial section of a construction for absorbing a fluid organic chemical, in web form, configured to reside, and resident in a filter cartridge.

Figure 1:
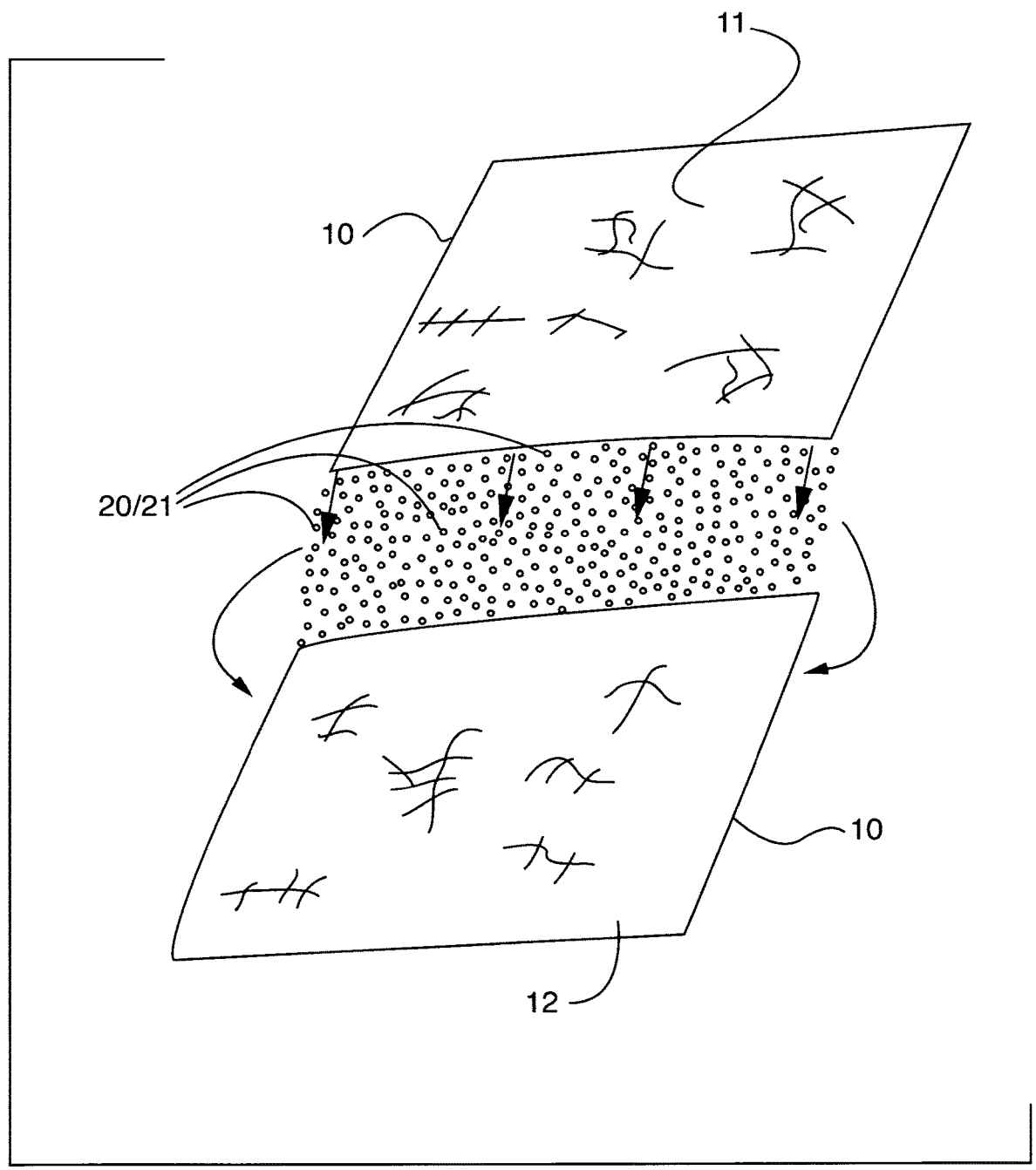
Figure 2:
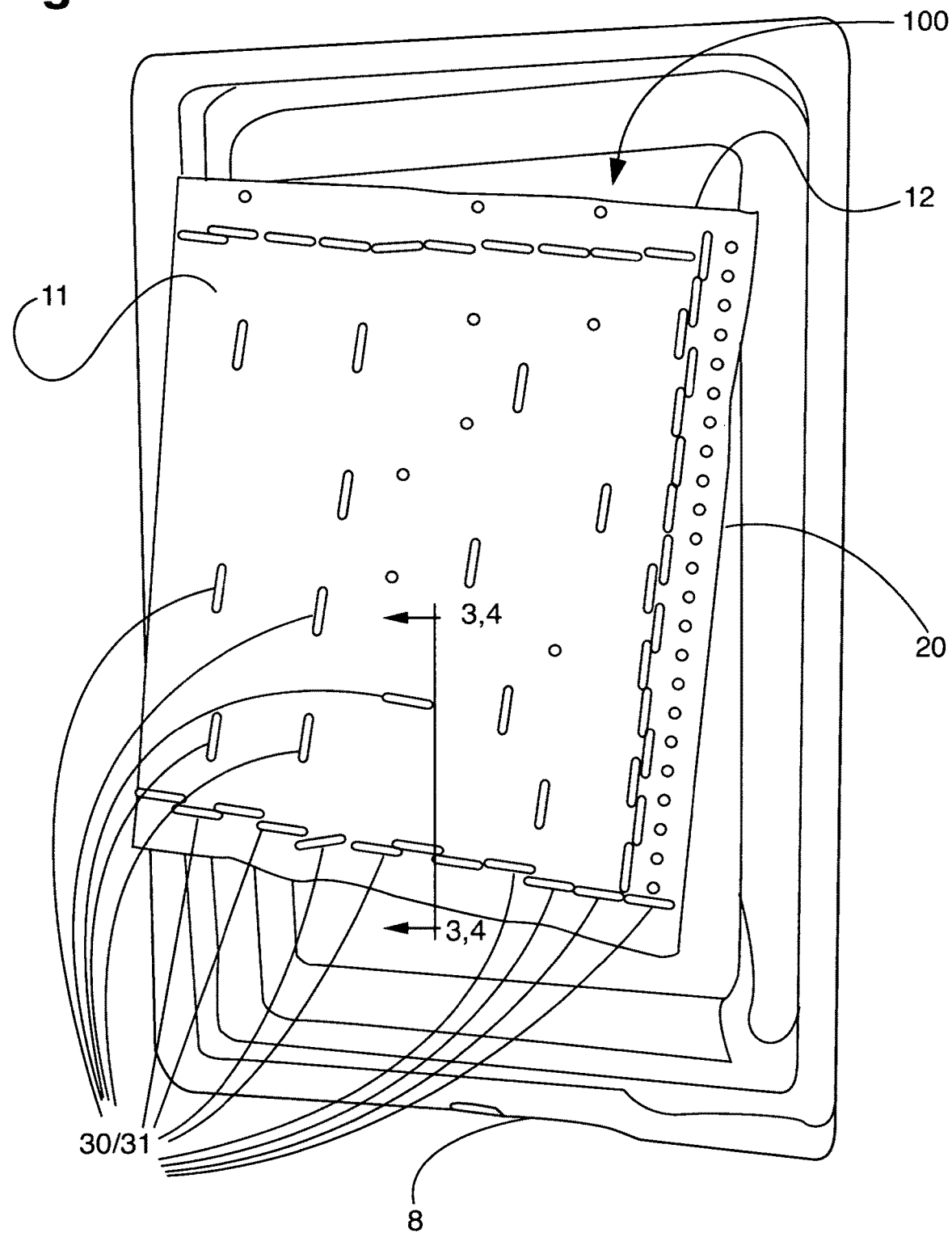
Figure 11:
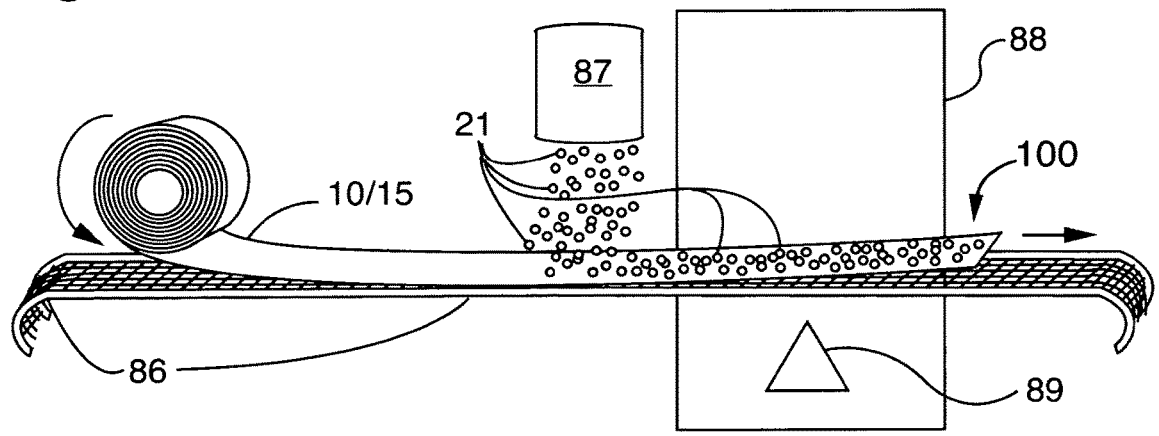

FIG. 11 is a plan view of manufacture of a construction for absorbing a fluid organic chemical. The construction is in web form.

Figure 12:
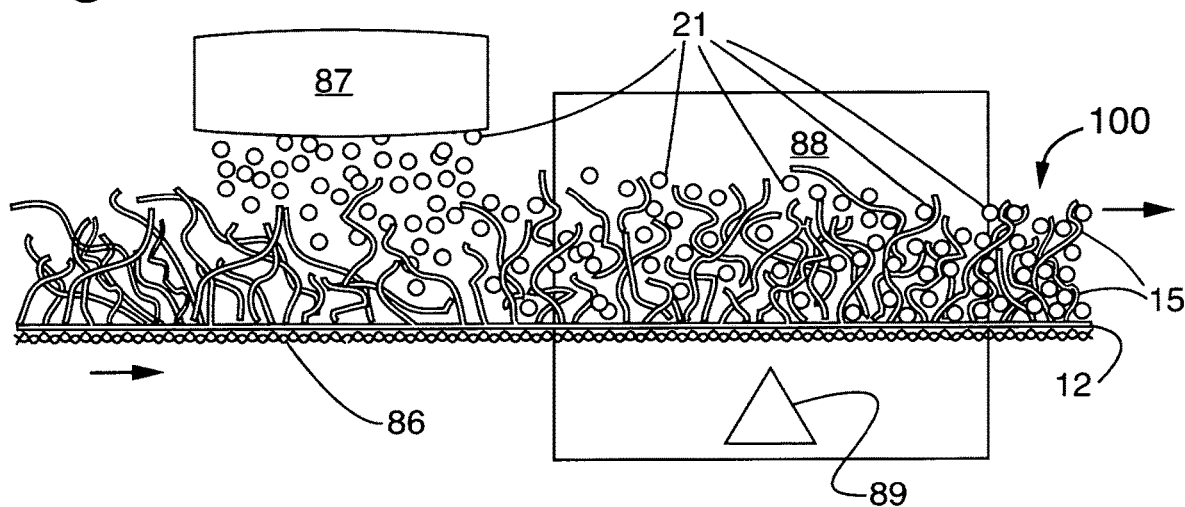

FIG. 12 is a sectional plan view in detail of part of the manufacture of FIG. 11.

Figure 13:
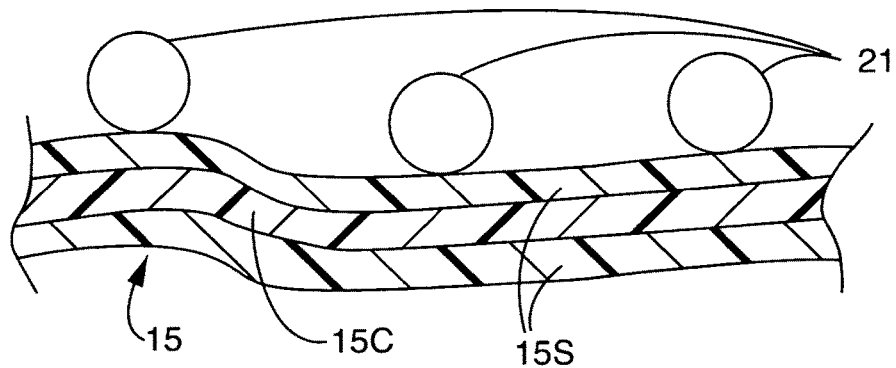

FIG. 13 is a sectional plan view of a bi-component filament and absorbent beads ready for attachment thereto. Such a filament and beads may be employed within a web as of FIG. 11.

Figure 14:
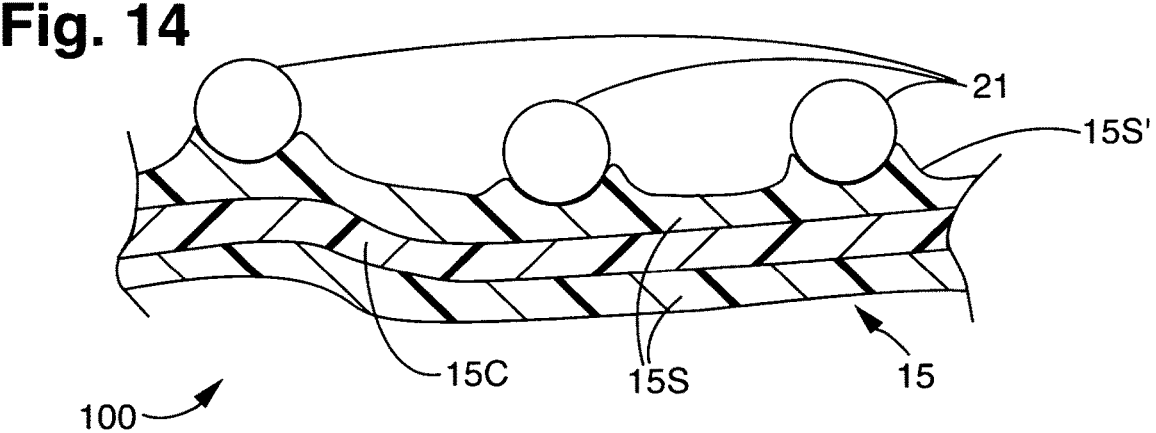

FIG. 14 is a sectional plan view of a filament as in FIG. 13, with beads attached thereto.

Figure 15:
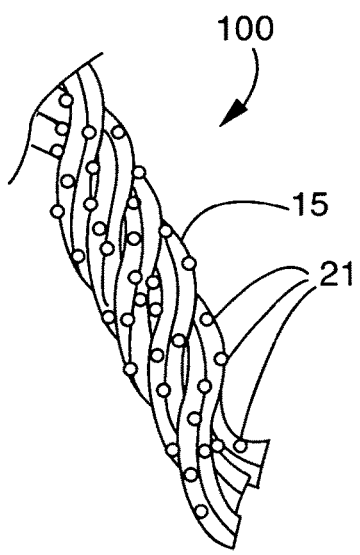

FIG. 15 is another construction for absorbing a fluid organic chemical in yarn form.

Figure 16:
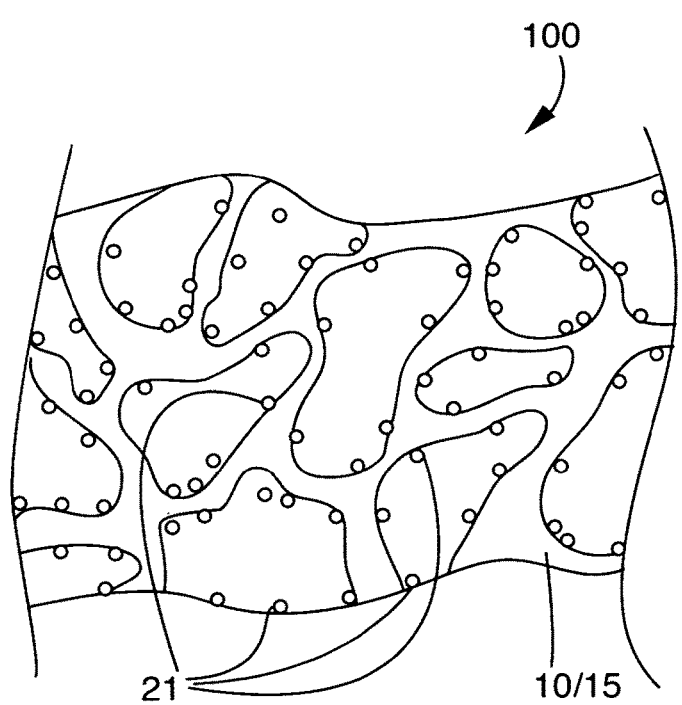

FIG. 16 is a construction for absorbing a fluid organic chemical in an open foam form.

The invention may be further understood by the additional detail set forth below. As with the foregoing, such detail, which also may be read in view of the drawings, is to be taken in an illustrative and not necessarily limiting sense.

The present construction includes at least one extended member. The extended member may be in a form of a woven or nonwoven plastic fabric or textile, or a woven or felt textile such as a cotton, flax, hemp, linen, or wool material, or a paper material, which may be cellulosic or inorganic—in a form of a sheet, strip, or string; a gauze, mesh or screen material such as made with the foregoing materials, a metal or a less extensively processed plant material; a woven or nonwoven yarn; a synthetic open-celled foam, for example, of polyurethane, which may be a reticulate foam; a natural or artificial sponge; and so forth. From among these, the material for the extended member can be a synthetic nonwoven—to include of a polyolefin, for example, polyethylene or polypropylene, a polyester, a nylon, and so forth—which, for example, can be a film, spun bonded, or melt blown. Knitting, weaving, wet laying, air laying, and so forth may be employed. A web or yarn incorporating a bicomponent filament may be employed in the extended member. The extended member may be a material generally inert yet pervious to the target material, for example, a polypropylene mat as noted in Flor et al., patent No. U.S. Pat. No. 7,862,779 B2, and it may be an adsorbent per ASTM F-726 such as melt-blown polypropylene as noted in Hall et al., patent No. U.S. Pat. No. 7,704,750 B2.

Any convenient size may be selected for the extended web. A sheet form of the extended web generally has a substantial length and width in comparison to its thickness, such as for embodiments for deployment in the field being about from half a foot (0.1524 of a meter) to twenty-five or fifty feet (7.62 meters or 15.24 meters) in length and a comparable dimension or less in width, for instance, such dimensions as from one-half to twenty feet (0.1524 of a meter to 6.096 meters) long by one-half to ten feet (0.1524 of a meter to 3.048 meters) long by one-sixteenth to one-half of an inch (0.159 of a centimeter to 1.27 centimeters) thick; from one to fifteen feet (0.3048 of a meter to 4.572 meters) long by one to eight feet (0.3048 of a meter to 2.438 meters) long by one eighth to one fourth of an inch (0.3175 of a centimeter to 0.635 of a meter) thick; and so forth. An extended web or sheet, say, on a roll, may be about thirty-nine inches (1.0 meter) by any length. Also, webs or sheets for the field may be, for example, about two feet by about two feet (about 0.6096 of a meter by about 0.6096 of a meter); about thirty-nine inches by about one, two or three feet or about thirty nine inches (about 1.0 meter by about 0.3048 of a meter, 0.6096 of a meter, 0.9144 of a meter, or 1.0 meter); or any other convenient dimensions. Of course, multiple sheets gain that much more in thickness in any "sandwich" web construction. A strip form generally has a substantial length and a width of a less substantial dimension, typically with the length more substantial than its thickness, for example, from eight inches to ten feet (0.2032 of a meter to 3.048 meters) long by one inch to four inches (2.54 centimeters to 10.16 centimeters) wide by one-sixteenth to one-third of an inch (0.159 to 0.847 of a centimeter) thick; from one foot to three feet (0.3048 to 0.9144 of a meter) long by two to three inches (5.08 to 7.62 centimeters) wide by one-eighth to one-fourth of an inch (0.3175 to 0.635 of a centimeter) thick; and so forth. The string or yarn form may generally have a substantial length, with a width and thickness substantially similar in dimension, which may be, for example, triangular, rectangular, square, hexagonal, elliptical or round in cross section looking down its length, for example, for employment in the field, about from fifty feet to one-half foot (15.24 meters to 0.1524 of a meter), twenty-five feet to one foot (7.62 meters to 0.1524 of a meter), twenty to two feet (6.096 meters to 0.6096 of a meter), fifteen to three feet (4.572 meters to 0.9144 of a meter), ten to five feet (3.048 to 1.524 meters), eight to five to three to two to one to one-half foot (2.438 to 1.524 meters to 0.9144 to 0.6096 to 0.3048 to 0.1524 of a meter) in length, and about from one sixteenth to one-half or one-eighth to one-fourth of an inch (0.159 of a centimeter to 1.27 centimeters or 0.3175 to 0.635 of a centimeter) wide and thick. More than one extended member may be present in a single web construction, for example, two, three, ten, twenty-five, fifty, a hundred or a thousand extended members, more or less. A numerical value from among the above may be selected independently of another. For example, a length may be from eight to fifty feet ((2.438 to 15.24 meters), and so forth. An employed film may be significantly thinner than listed as above.

The sheet or strip form may be perforate or imperforate.

The extended member associates the water-insoluble polymer, for example, by bonding, entrapping, entraining, enveloping or holding. The associated water-insoluble polymer can absorb one or more fluid organic chemical(s) individually, successively, and/or in a mixture.

The water-insoluble polymer that can absorb the fluid organic chemical, in general, is an absorbent. That absorbent can be or contain water insoluble, particulate polymer particles which imbibe liquid organic materials. As described in Hall, patent No. U.S. Pat. No. 7,169,318 B 1, in citation of Hall et al., U.S. Pat. No. 3,750,688—on contact with the organic material the absorbent may swell as it is absorbed or imbibed. It may not be critical to employ a cross-linked polymer that swells but does not dissolve. However, cross-linked organic liquid-imbibing polymers are preferred. A wide variety of polymeric materials are employed with benefit. Such polymers include polymers of styrenes and substituted styrenes; copolymers of vinyl chloride including a copolymer of sixty weight percent vinyl chloride and forty weight percent vinyl acetate; vinylidene chloride copolymers including a copolymer of seventy-five percent vinylidene chloride and twenty-five percent acrylonitrile; acrylic polymers such as polymers of methylmethacrylate, ethyl acrylate, and so forth and the like. Particularly advantageous materials which respond to a wide variety of organic liquids are the polymers of styrene such as polystyrene and polymers of styrene and divinylbenzene containing up to ten weight percent divinylbenzene. For general use with aliphatic and aromatic hydrocarbons, alkylstyrene polymers are of particular benefit. Such alkylstyrene polymers swell very rapidly on contact with aliphatic and/or aromatic hydrocarbons. Alkylstyrene polymers usually show substantial swelling in less than a minute when in contact with organic liquids. Cross-linked polymers of styrenes, notably tertiary-alkylstyrenes, are used to advantage as the imbibing agent. Those alkylstyrenes which can be used to prepare these imbibing polymers have alkyl groups having four to twenty, especially four to twelve, carbon atoms, examples of which include p-tert-, m-, tert-, sec-, and/or iso-alkyl styrenes such as of butylstyrene, amylstyrene, hexylstyrene, octylstyrene, dodecylstyrene, octadecylstyrene and eiscosyl-styrene. Further, cross-linked copolymers of such alkylstyrenes as aforementioned and an alkyl ester derived from a one to eighteen carbon alcohol and acrylic or methacrylic acid or mixture thereof. Suitable monomers which can be employed as comonomers with the alkylstyrene include such materials as vinylnaphthalene, styrene, alpha-methylstyrene, ring-substituted alpha-methylstyrenes, halostyrenes, arylstyrenes and alkarylstyrenes, methacrylic esters, acrylic esters; esters and half esters of fumaric, maleic, itaconic acids; vinyl biphenyls, vinyl esters of aliphatic carboxylic acid esters, alkyl vinyl ethers, alkyl vinyl ketones, alpha-olefins, iso-olefins, butadiene, isoprene, dimethylbutadiene, acrylobisnitrile, methacrylonitrile, and so forth and the like. A slight amount of cross-linking agent can be contained in the polymer, say, in the range about from 0.01 to two percent by weight. A highly efficient imbibition of organic liquid contaminants occurs when the level of cross-linking agent is less than about one percent by weight since this permits the polymer to swell easily and imbibe a substantial volume of the organic material. Up to two, say, about from one to two, percent cross-linking agent is satisfactory in other cases. Suitable cross-linking agents include polyethylenically unsaturated compounds such as divinylbenzene, diethylene glycol dimethacrylate, diisopropenylbenzene, diisopropenyldiphenyl, diallylmaleate, diallylphthalate, allylacrylates, allymethacrylates, allylfumarates, allylitaconates, alkyd resin type cross-linking agents, butadiene or isoprene polymers, cyclooctadiene, methylene norbornlylenes, divinyl phthalates, vinyl isopropenylbenzene, divinyl biphenyl, as well as any other di- or poly-functional compounds known to be of use as a cross-linking agent in polymerical vinyl addition compositions. If there is too much cross-linking agent, the imbibition takes an unreasonably long time, or the polymer is unable to imbibe a sufficient quantity of the organic liquid. If the imbibitional polymer contains no or too little cross-linking agent, then it may well eventually dissolve or partially dissolve in the organic material resulting, for example, in a non-discrete, non-particulate mass of polymer-thickened organic liquid. However, for various applications, uncrosslinked material may be satisfactory. The imbibing polymers may be prepared by any suitable technique. For instance, suspension, emulsion or mass polymerization may be employed. Generally, as is well known in the art, the method of preparation is selected to provide imbibing polymer in the most convenient form for any particular application. Note, Alfrey, Jr., et al., U.S. Pat. No. 3,322,695. A latex polymer such as described in Larson et al., U.S. Pat. No. 4,302,337, or other polymer, may be employed. The water-insoluble polymer that can absorb the liquid organic chemical beneficially is or includes a cross-linked polystyrene. The foregoing water-insoluble polymer that can absorb the liquid organic chemical may be capable of absorbing an organic chemical in vapor. An organic chemical in supercritical, fluid form may be absorbed by a water-insoluble polymer from among the foregoing.

Also, among substituted styrenes that may be employed to make the water-insoluble polymer particles or beads that can absorb the fluid organic chemical are methyl styrene (vinyl toluene) and chlorostyrene. Note, Hall et al. U.S. Pat. No. 3,750,688.

Selection of a water-insoluble polymer for use with any organic liquid is readily accomplished by determining a swelling index for the polymer particles. Beneficially, such a swelling index is readily determined by immersing a particulate polymer to be evaluated in water until the polymer has reached equilibrium swelling and subsequently adding the desired organic liquid and determining the volume per unit weight of polymer after a period of 30 minutes with water and organic liquid and the volume per unit weight of the polymer when in equilibrium with water. The ratio of the volume per unit weight with organic liquid and water to volume per unit weight of the polymer with water provides the swelling index. If the polymer is soluble, the swelling index is infinite. Beneficially for most applications a swelling index of at least 1.5 and preferably greater than about 3 is desirable. For most applications it is desirable to employ a polymer which is cross-linked to a sufficient degree that it exhibits a swelling index between about 1.5 and 50 and preferably between about 3 and 50. By utilizing the cross-linked polymer the hazard of dissolution of the polymer over extended periods of time is eliminated.

The water-insoluble polymer that can absorb the fluid organic chemical can be in particle form. For example, a cross-linked polystyrene particle sample may be employed. Imbiber Beads® cross-linked polystyrene particles are advantageously employed. Such a polymer may be applied to an extended member as a latex coating.

The water-insoluble polymer that can absorb the fluid organic chemical, in general, is a true absorbent of that organic chemical, not a mere adsorbent. It may be that it "imbibes" the target organic chemical, and swells upon absorbing the chemical. Examples of fluid organic chemicals from among the thousands that can be absorbed or imbibed, particularly from the liquid state, include hydrocarbons such aliphatic hydrocarbons including alkanes, alkenes, alkynes, and cyclic versions thereof, aromatic hydrocarbons including aliphatic-substituted aromatic hydrocarbons, hydrocarbons substituted with groups having moieties in addition to or in lieu of carbon and hydrogen, thus, hexane, cyclohexane, hexene, hexyne, octane, decane, benzene, toluene, and so forth, nitrogen-, oxygen-, sulphur-, and/or halogen-substituted hydrocarbons, and mixtures thereof, to include gasoline, kerosene, diesel fuel, fuel oil, motor oil, transformer oil, crude oil, and so forth and the like.

The absorbing polymer in particulate form may immobilize a fluid organic target chemical or mixture substances within five, ten or fifteen minutes, or somewhat longer. For a few representative examples, substances generally having immobilization within ten minutes (class 1 chemical absorption) generally include allylbromide, n-amylbenzene, amyl acetate, amylene, benzene, benzyl chloride, 2-bromoethylbenzene, bromotrichloro methane, butyl acryulate, t-butyl-benzene, butyl cellosolve, t-butylstyrene, carbon disulfide, cellusolve acetate, 2-chlorobenzaldehyde, chlorobenzol, chloropentanes, chloroform, cyclohexane, decalin, dibutyl ether, diethyl carbonate, diisobutylamine, diisobutylketone, dimethylsulfide, dipentene, diphenyloxide, epichlorohydrin, 1,2-epoxydodecane, ethyl benzene, ethylbromide, ethylchloride, 2-ethylhexylamine, benzaldehyde, bromobenzene, butylbenzoate, butyric acid, carbon tetrachloride, m-chloroanaline, chlorobenzene, chloroform, chlorostyrene, p-cymene, dichloroisopropylether, 1-diethylketone, dimethoxymethane, dioxane, ethylacetate, ethyl acrylate, ethylbutyrate, ethyliodide, ethylpropyl ether, ethyllaurate, ethyltoluene, #2 fuel oil, gasoline, 2-heptanone, iodohexane, isobutylacetate, isopar E, methoxynaphthalene, methylamylacetate, methylene chloride, methylmethacrylate, mineral spirits, naphtha 107-142, octane, oil of citronella, 3-pentanone, pyridine, styrene, tetrahydrofuran, thionyl chloride, toluene, benzotrichloride, valeronitrile, vinylpyridine, ethoxyazolene, Freon-113, heptane, hexane, iodomethane, isobutlyamine, isopropyl acetate, mesitylene, methylacrylate, methylbenzoate, methylethylketone, methylpropionate, naphtha, nitrobenzene, pentane, perchloroethylene, propylene oxide, quinolone, styrene oxide, thiophene, turpentine, vinyl acetate, vinyl toluene, VMSP naphtha, xylene, and so forth; substances generally having immobilization within fifteen minutes (class 2 chemical absorption) generally include acetophenone, benzensufonyl chloride, chloroacetone, diacetone, #2 diesel, N,N-dimethylpiperazine, ethyloctynol, fluorobenzene, isoamylisovalerate, kerosene, 2-methylbenzothiazole, stearyol chloride, 50 aniline/50 nitrobenzene, n-butylstearate, 2-chlorothiazone, dimethyldodecylamine, ethyleneimine, 1-ethynyl-1-cyclo-hexanol, #1 fuel oil, isopropylacetrophenone, methylacetate, pentylacetate, m-toluidine, and so forth; and substances generally having immobilization within more than fifteen minutes (class 3 chemical absorption) generally include 2-amino-2-methylpropanol, cyclopentanol, dimethylaniline, dodecyltoluene, 2ethylhexanoic acid, isoamylnitrite, methylacetoacetate, naphthol, oleic acid, benzylacetate, dimethylhyxynol, dodecylbenzene, ethylbenzoate, modified #4 fuel and oil, nitrooctane, Wesson brand cooking oil, and so forth.

Any suitably sized water-insoluble polymer particle that can absorb the fluid organic chemical can be employed. For instance, cross-linked polystyrene beads of a 50-micron or a 150-micron to 400-micron size can be employed. Smaller beads have a greater surface area to volume ratio than larger beads and can engender and increase pick-up of decreased concentration target organic chemical. Such beads as small as of a 10-micron to a 15-micron up to a 50-micron size may be employed. Even such beads as small as of a 1-micron to 1.5-micron size, a general equivalent to talcum powder size or latex, may be employed, for example, through a latex spray. Beads of, about, or approaching angstrom size may be provided, and applied, for example, through a latex spray. Nonetheless, a desirable dimension for the cross-linked polystyrene bead sample is about a 210-micron size.

The water-insoluble polymer that can absorb the fluid organic chemical is associated with the extended member. Any suitable method may be employed. The resulting construction provides for contact of the water-insoluble polymer with the fluid organic chemical when deployed in an environment where the fluid organic chemical may be present for absorption. For instance, entrapping can be carried out by the simple expedient of providing a supply of particles of water-insoluble polymer that can absorb the fluid organic chemical and sprinkling the particles onto a bottom extended member, covering the sprinkled bottom extended member with a top extended member, and taping the sides with adhesive tape. Stapling or sewing, examples of physical methods in which a solid penetrates one extended member or more and leaves solid species to hold a plurality of extended members together, may be employed, as well as may be gluing, heat-sealing, heat-welding, solvent-welding, needle punching, and so forth. A method such as gluing or tack-forming by heat and so forth may affix or adhere the water-insoluble polymer to an extended member, incorporating it intrinsically, whereas as a physical method such stapling or sewing would tend to leave polymer not chemically bonded to the extended member. Segregating or sequestering particulate water-insoluble polymer that can absorb the fluid organic material, for example, beads of cross-linked polystyrene, in pockets or more discrete areas smaller than the overall area of the web construction can be done. Compare, Kellenberger et al., U.S. Pat. No. 5,149,335. Application of a water-insoluble polymer particle that can absorb the fluid organic chemical to the extended member is carried out with the initial and final sizes of the particle in mind. For example, with a commercially available, Imbiber Beads® sample, the beads before contact with a liquid organic chemical may be dispersed adequately but not too closely together, keeping in mind that each bead may absorb liquid organic chemicals and expand dramatically, say, up to three times its original diameter, and, in general, as in a case of a non-spherically shaped bead, perhaps up to twenty-seven times its original volume. A mono-layer of a sample of Imbiber Beads® particles may be employed with respect to an extended member. Coating with the absorbing polymer can provide for a thin layer on an extended member, which may be done in strips or separate areas.

The absorbing polymer may be made at any suitable weight distribution per area application rate. For example, the cross-linked polystyrene beads may be applied at about one-half a gram, or one, two, three, three and one half, four, five, seven, nine, eleven, fourteen, seventeen, or twenty grams per square foot (per nine hundred twenty-nine square centimeters), or any range about from one to another of any two of such values, and so forth. In general, however, depending on the composition of the absorbing polymer, applications about fourteen grams per square foot (per nine hundred twenty-nine square centimeters) and above may be considered to be more than necessary with respect to liquid organic target chemicals or mixtures.

A laminate can be provided with at least three extended sheet or strip form members. At least two of these extended members have generally between them, preferably internally, the water-insoluble polymer that can absorb the fluid organic chemical.

Advantageous embodiments also can be provided through employment of bicomponent polymer filament materials, especially in embodiments including open matrix nonwovens. Suitable bicomponent polymer filament materials comprise an inner polymer core and an outer polymer layer or sheath, in which the sheath has a lower melting temperature than the core. Compare, Nielsen et al., U.S. Pat. Nos. 5,167,764 and 5,167,765. For example, the inner core may be, but is not limited to, a polyester, a polypropylene, a nylon, PLA, PEEK, PEI, PES, PPS, and so forth and the like, and the sheath may be a lower temperature melting polymer than the polymer chosen for the core and includes, but is not limited to, a polypropylene, a polyethylene, a polyester, a nylon, and so forth and the like. Preferably, the bicomponent polymer filament material is a readily available polymer such as a polyester. In general, the absorbing polymer, for example, a sample of the cross-linked polystyrene beads, can be sprinkled on a nonwoven mat made of or including biocomponent filament materials, say, having a polyester core and a polypropylene sheath that melts about from 170° C. to 175° C., for instance about 173° C., for instance, laid on a conveyor screen that passes through an oven having a hot air blower as a heat source, set at about 200° C. If desired, the nonwoven mat may have a bottom layer, say, of a spun bond material such as of polypropylene. The beads work their way into the open matrix and, upon contact with the slightly melted, tacky sheath polymer, for example, of polypropylene, stick, and, upon cooling with exit from the oven, are secured to the matrix to make the present construction. Also, if desired, top layer such as a spun bond polypropylene may be provided after exit from the oven.

In light of the foregoing, with respect to the drawings, compromised sample 8, for one illustration, an aqueous sample, which may contain fluid target organic chemical substance(s), is present for sequestration of such fluid target organic chemical substance(s) so as to provide cleaner or cleaned sample 9, through contact of the compromised sample 8 with construction 100 for absorbing a fluid organic chemical, which includes extended web, fabric, yarn or foam member 10 having water-insoluble polymer 20 associated therewith, wherein the water-insoluble polymer can absorb the fluid organic chemical, and the construction 100 provides for contact of the water-insoluble polymer with the fluid organic chemical when deployed in an environment where the fluid organic chemical may be present for absorption. The following is also noted:

REFERENCE NUMERAL COMMENT

11 Top pad or layer.
12 Bottom pad or layer.
13 Middle pad or layer.
15 Bicomponent polymer filament.
15C Bicomponent polymer filament core.
15S Bicomponent polymer filament sheath.
15S' Biocomponent polymer filament sheath heat melt weld to water-insoluble bead or particle that can absorb the fluid organic chemical(s) as target(s).
16 Open foam or sponge matrix.
21 Water-insoluble polymer bead or particle that can absorb the fluid organic chemical(s) as target(s).
22 Water-insoluble polymer bead or particle that has absorbed the fluid organic chemical(s) as target(s).
30 Constrainment for water-insoluble beads or particles.
31 Physical constrainment for the water-insoluble beads or particles, for example, staples or stitches.
32 Adhesive constrainment for the water-insoluble beads or particles, for example, gluing or tack-forming by heat.
40 Filter canister.
86 Supporting screen, for example, as a conveyor.
87 Sprinkling device to apply the water-insoluble beads or particles to the extended web, fabric, yarn or foam member.
88 Oven.
89 Heat source.

In any event, the web construction provides for contact of the water-insoluble polymer with the fluid organic chemical when deployed in an environment where the fluid organic chemical may be present for absorption. Deployment may be in an industrial or home setting, in an engine room or sink, a stack, or on a floor, runway, street or sidewalk, in a floor drain, on a shelf or wall, or deployment may be outdoors, for example, in a storm drain. The deployment can be in an aquatic environment, for example, in a lake, ocean, pond, puddle, swimming pool, or storm drain; in an aqueous environment, for example, on damp pavement, on a damp floor or wall; or in a dry environment, i.e., an environment where for practical purposes water is absent and the organics can be absorbed, imbibed or immobilized, for example, directly on a liquid organic chemical spill on dry pavement or a dry floor or in air. The web construction can be made to perform as a filter, for example, for a dilute liquid or vaporous organic chemical in a water flow or stream, or in air, and the filter may be configured, for example, by folding, which can include folding in an accordion fold if desired, to be held in a housing, for example, a filter canister, which may have an entry port for substance to be cleansed of liquid organic chemical and an exit port for the substance after it has contacted the filter and liquid organic chemical removed all or in part. A filter system may have a plurality of filters in series.

A spill indicator may be employed with the present web construction. See, e.g., Hall et al., U.S. Pat. No. 7,704,750 B2; and Flor et al., U.S. Pat. No. 7,862,779 B2.

The web or yarn construction may be employed as it is, for example akin to a rag, rug or throw, or a rope, tie or whip; mounted to a pole as a flag (sheet or strip forms) or a mop (strip or string forms) or mounted with a frame as a flat strainer or a cup-like net as would resemble a butterfly or fishing net; erected with or without a frame as a shelter or tent for protection against air-borne organic contaminants; and so forth and the like. Disposal of used web or yarn construction is carried out according to approved methods.

Numerical values herein may be considered to be exact or approximate.

The following examples further illustrate the invention.

EXAMPLE 1

A first spun bond nonwoven web sheet of polypropylene as a bottom layer has applied to it by sprinkling a sample of 210-micron diameter Imbiber Beads® cross-linked polystyrene particles at about 3.5 grams per square foot (per nine hundred twenty-nine square centimeters). An indicating dye is provided with the particles. A second spun bond nonwoven web sheet of polypropylene as a top layer is placed as a cover to the bottom layer having the sprinkled particles thereon, and discrete pockets are made for constraining the particles by stapling near the outer boundary and at select locations inside the outer boundary to form a construction hereof.

The construction is placed in a dish holding water and liquid diesel fuel. The diesel fuel is absorbed by the particles, and the dye provides a red or pink color to the construction to indicate that the diesel is encountered and absorbed or imbibed by the particles.

EXAMPLE 2

A carded and needle-punched nonwoven sheet is constructed with a plurality of fibers such that a matrix fiber is combined with bicomponent fiber to the degree that a suitable area of sheath of the bicomponent fiber captures a desired amount of Imbiber Beads® absorbing polymer particles made, for example, with a cross-linked polystyrene. This can be in a range of about from 1:99 to 99:1 bicomponent fiber to matrix fiber by volume, or the bicomponent fiber can be at 100% of the nonwoven. Preferably, the ratio of bicomponent fiber to matrix fiber is about from 20% bicomponent fiber and 80% matrix fiber by volume to 90% bicomponent fiber and 10% matrix fiber by volume. The choice of blend ratios can be chosen on the basis of cost (matrix fiber typically being less expensive than bicomponent fiber) and the amount of organic chemical absorbing water-insoluble polymer desired.

Once the nonwoven is constructed, the particles of the desired organic chemical absorbing water-insoluble polymer (imbiber) are applied using an electromagnetic vibratory feed shaker device such as supplied by the Erize Company, Erie, Pa., U.S.A. As the nonwoven passes under the imbiber particle applicator, the nonwoven with applied particles is fed into a suitable oven where the temperature of the nonwoven/imbiber particle material is raised past the melt point of the sheath of the bicomponent polymer, adhering the imbiber particles to the bicomponent fiber. The nonwoven composition with imbiber particle material then exits the oven as a construction for absorbing a fluid, and is either sheeted or wound into a roll. Later, cutting of and/or other operations to the construction for absorbing a fluid can be carried out.

EXAMPLE 3

An imbiber particle material as from the preceding examples is applied to a yarn as a solid material onto yarn that either has an adhesive applied to its surface or, if the yarn contains sufficient bicomponent fiber, is thermally adhered to the surface of the yarn. As an alternative, the imbiber particle material is suspended in a liquid adhesive and as a mixture is applied to the yarn and bonded through drying.

A construction for absorbing a fluid, which is in a form of a yarn, is yielded.

CONCLUSION TO THE INVENTION

The present invention is thus provided. Various feature(s), part(s), step(s), subcombination(s) and/or combination(s) can be employed with or without reference to other feature(s), part(s), step(s), subcombination(s) and/or combination(s) in the practice of the invention, and numerous adaptations and modifications can be effected within its spirit, the literal claim scope of which is particularly pointed out as follows:

What is claimed is:
1. A method for absorbing and immobilizing at least one fluid organic chemical, which comprises the following steps:
   identifying an environment to have the at least one fluid organic chemical for absorption and immobilization;
   providing a construction for absorbing and immobilizing the at least one fluid organic chemical through absorption, the construction including:
      an extended web, fabric, yarn or open foam member having a matrix; and
      a plurality of fluid-organic-chemical-swellable, water-insoluble, solid polymer particles or beads associated and held with the extended web, fabric, yarn or open foam member and entrained within the matrix thereof, wherein said particles or beads are:
         characterized in that they absorb/imbibe and immobilize the at least one fluid organic chemical with contact of said particles or beads with the at least one fluid organic chemical;
         characterized in that they swell as the at least one fluid organic chemical is absorbed/imbibed and immobilized;
         characterized in that they have a swelling index of at least 1.5 with respect to the at least one fluid organic chemical;
         characterized in that they remain solid when they absorb/imbibe and immobilize the at least one fluid organic chemical; and
         dispersed into contact with the extended web, fabric, yarn or open foam member at a rate of at most about twenty grams of said particles or beads per square foot of the extended web, fabric, yarn or open foam member, and can absorb and immobilize the at least one fluid organic chemical; and
      that said construction provides for contact of said particles or beads with the at least one fluid organic chemical when deployed in the environment to have the at least one fluid organic chemical for the absorption and immobilization; and
   deploying said construction in the environment to have the at least one fluid organic chemical for absorption and immobilization so as to provide for contact of said particles or beads with the at least one fluid organic chemical such that the at least one fluid organic chemical is absorbed and immobilized, and said particles or beads swell with the absorption.

2. The method of claim 1, wherein said particles or beads are inclusive of said particles or beads being about 400 microns or less.

3. The method of claim 2, wherein said particles or beads are distributed at about from one to seven grams per square foot the extended web, fabric, yarn or open foam member.

4. The method of claim 3, wherein the at least one fluid organic chemical is a liquid.

5. The method of claim 4, wherein the at least one fluid organic chemical includes at least one of a gasoline, a kerosene, and an oil.

6. The method of claim 5, wherein said particles or beads consist essentially of a cross-linked polymer of a styrene and/or a substituted styrene.

7. The method of claim 2, wherein the at least one fluid organic chemical is a liquid.

8. The method of claim 7, wherein the at least one fluid organic chemical includes at least one of a gasoline, a diesel fuel, a kerosene, and an oil.

9. The method of claim 8, wherein said particles or beads consist essentially of a cross-linked polymer of a styrene and/or a substituted styrene.

10. The method of claim 1, wherein the at least one fluid organic chemical is a liquid.

11. The method of claim 10, wherein the at least one fluid organic chemical includes at least one of a gasoline, a diesel fuel, a kerosene, and an oil.

12. The method of claim 11, wherein said particles or beads consist essentially of a cross-linked polymer of a styrene and/or a substituted styrene.

13. A method for absorbing and immobilizing at least one liquid organic chemical, which comprises the following steps:
   identifying an environment to have the at least one liquid organic chemical for absorption and immobilization;
   providing a construction for absorbing and immobilizing the at least one liquid organic chemical through absorption—the construction including:
      an extended web, fabric, yarn or open foam member having a matrix; and
      a plurality of liquid-organic-chemical-swellable, water-insoluble, solid polymer particles or beads associated and held with the extended web, fabric, yarn or open foam member and entrained within the matrix thereof, which are present at most about fourteen grams per square foot of the extended web, fabric, yarn or open foam member, and which are characterized in that they:
         absorb/imbibe and immobilize the at least one liquid organic chemical with contact of the at least one liquid organic chemical;
         swell as the at least one liquid organic chemical is absorbed/imbibed and immobilized;
         have a swelling index greater than about 3 with respect to the at least one liquid organic chemical; and
         remain solid when they absorb/imbibe and immobilize the at least one liquid organic chemical—such that said construction provides for contact of said particles or beads with the at least one liquid organic chemical when deployed in the environment to have the at least one liquid organic chemical for the absorption and immobilization; and
   deploying said construction in the environment to have the at least one liquid organic chemical for absorption and immobilization so as to provide for contact of said particles or beads with the at least one liquid organic chemical such that the at least one liquid organic chemical is absorbed and immobilized, and said particles or beads swell with the absorption.

14. The method of claim 13, wherein said at least one liquid organic chemical includes at least one of a gasoline, a diesel fuel, a kerosene, and an oil.

15. The method of claim 14, wherein said particles or beads consist essentially of a cross-linked polymer of a styrene and/or a substituted styrene.

16. The method of claim 13, wherein said at least one liquid organic chemical is present as a contaminant in water.

17. The method of claim 13, wherein said particles or beads are or include a latex polymer.

18. A method for absorbing and immobilizing at least one liquid organic chemical, which comprises the following steps:
   identifying an environment to have the at least one liquid organic chemical for absorption and immobilization;
   providing a construction for absorbing and immobilizing the at least one liquid organic chemical through absorption—the construction including:
      an extended web or fabric member in sheet form of a synthetic nonwoven material having a matrix; and
      a plurality of liquid-organic-chemical-swellable, water-insoluble, solid polymer particles or beads associated and held with the extended web or fabric member and entrained within the matrix thereof, which are present at most about fourteen grams per square foot of the extended web or fabric member, and which are characterized in that they:
         absorb/imbibe and immobilize the at least one liquid organic chemical with contact of the at least one liquid organic chemical;
         swell as the at least one liquid organic chemical is absorbed/imbibed and immobilized;
         have a swelling index greater than about 3 with respect to the at least one liquid organic chemical; and
         remain solid when they absorb/imbibe and immobilize the at least one liquid organic chemical—such that said construction provides for contact of said particles or beads with the at least one liquid organic chemical when deployed in an environment where the at least one liquid organic chemical is present for the absorption and immobilization; and
   deploying said construction in the environment to have the at least one liquid organic chemical for absorption and immobilization so as to provide for contact of said particles or beads with the at least one liquid organic chemical such that the at least one liquid organic chemical is absorbed and immobilized, and said particles or beads swell with the absorption, wherein:
      when the at least one liquid organic chemical for absorption and immobilization is a class 1 absorption chemical, its immobilization generally occurs within ten minutes of its contact with said particles or beads; and
      when the at least one liquid organic chemical for absorption and immobilization is a class 2 absorption chemical, its immobilization generally occurs within fifteen minutes its contact with said particles or beads.

19. The method of claim 18, wherein the synthetic nonwoven material is an adsorbent of the at least one liquid organic material present for absorption and immobilization that is selected from the group consisting of a polyolefin, a polyester, a nylon, and a combination thereof; and said particles or beads consist essentially of a cross-linked polymer of a styrene and/or a substituted styrene.

20. The method of claim 19, wherein the synthetic nonwoven material is a polypropylene; the substituted styrene includes an alkylstyrene; and the at least one liquid organic chemical present for absorption and immobilization includes at least one of a gasoline, a diesel fuel, a kerosene, and an oil.

* * * * *